US008433098B1

(12) United States Patent
Medasani et al.

(10) Patent No.: US 8,433,098 B1
(45) Date of Patent: Apr. 30, 2013

(54) METHOD AND SYSTEM FOR GENERIC OBJECT DETECTION USING BLOCK FEATURES

(75) Inventors: Swarup Medasani, Thousand Oaks, CA (US); Rahul Shringarpure, Calabasas, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 13/535,098

(22) Filed: Jun. 27, 2012

Related U.S. Application Data

(62) Division of application No. 12/380,415, filed on Feb. 27, 2009, now Pat. No. 8,270,671.

(51) Int. Cl.
*G06K 9/00* (2006.01)
(52) U.S. Cl.
USPC ......................................................... 382/103
(58) Field of Classification Search .......... 382/101–107; 348/169–173
See application file for complete search history.

(56) References Cited

U.S. PATENT DOCUMENTS

| 7,636,700 B2 | 12/2009 | Owechko et al. |
| 2005/0196047 A1 | 9/2005 | Owechko et al. |

OTHER PUBLICATIONS

Y. Owechko, et al., "Classifier Swarms for Human Detection in Infrared Imagery," Proc. of the CVPR workshop on Object Tracking and classification Beyond the Visibile Spectrum (OTCVBS'04), 2004.
"Edge Detection Reference Design", Application Note 364, Oct. 2004, Altera Corp, San Jose, CA.

*Primary Examiner* — Atiba O Fitzpatrick
(74) *Attorney, Agent, or Firm* — Tope-McKay & Associates

(57) ABSTRACT

Disclosed is a method and system for generic object detection using block-based feature computation and, more specifically, a method and system for massively parallel computation of object features sets according to an optimized clock-cycle matrix. The method uses an array of correlators to calculate block sums for each section of the image to be analyzed. A greedy heuristic scheduling algorithm is executed to produce an optimized clock cycle matrix such that overlapping features which use the same block sum do not attempt to access the block at the same time, thereby avoiding race memory conditions. The processing system can employ any of a variety of hardwired Very Large Scale Integration (VLSI) chips such as Field Programmable Gate Arrays (FPGAs), Digital Signal Processors (DSPs) and Application Specific Integrated Circuits (ASICs).

3 Claims, 11 Drawing Sheets

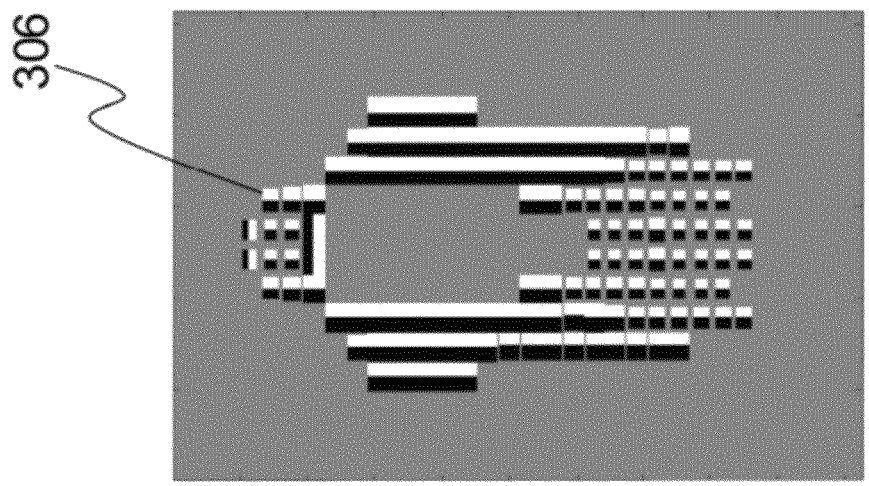
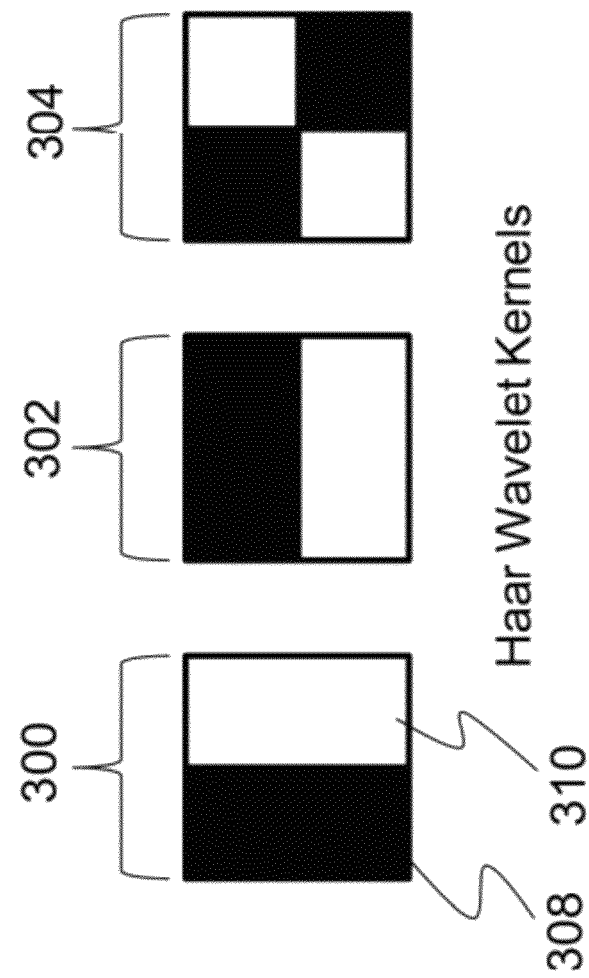
FIG. 3B
FIG. 3A
Haar Wavelet Kernels

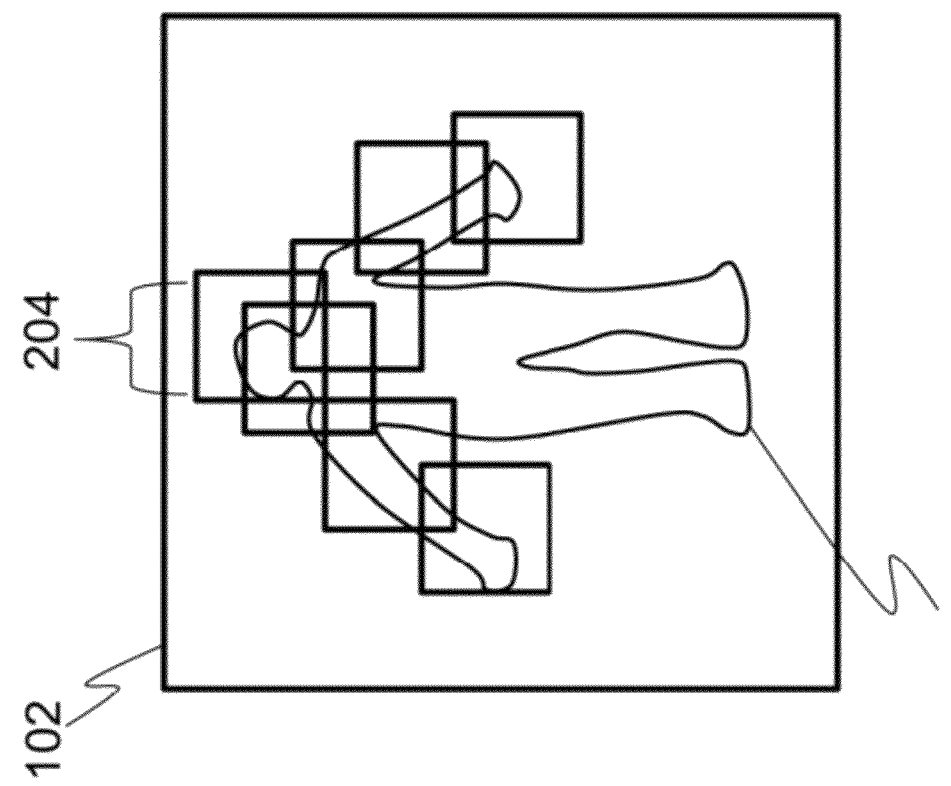
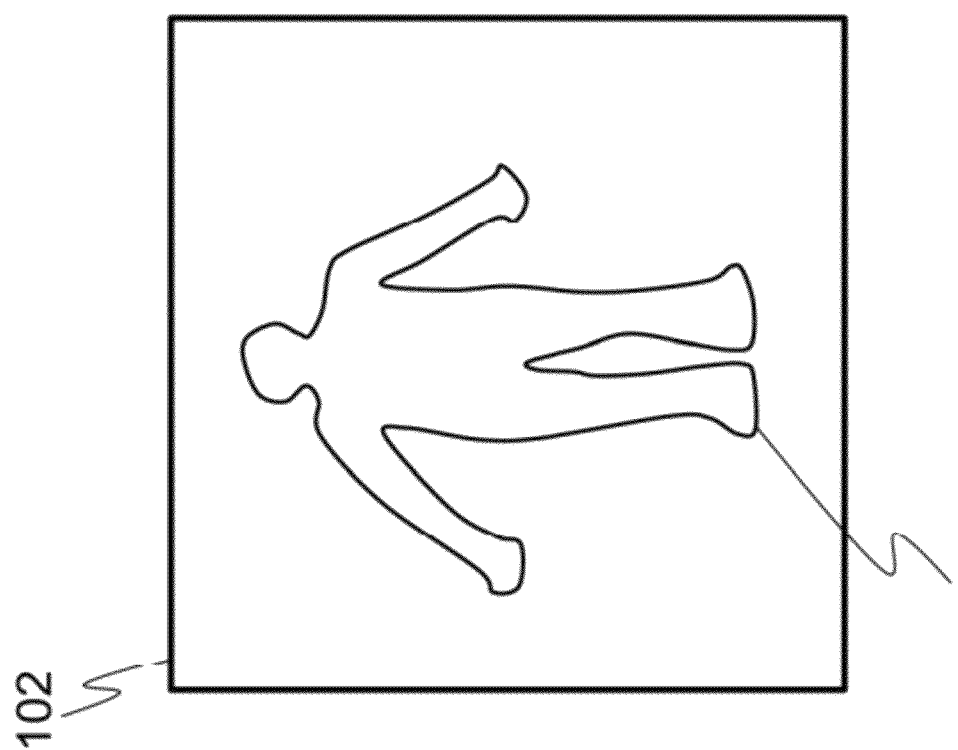

|   |   |   |   |   | 1 | 2 | 3 | 3 | 3 | 3 | 3 | 3 | 2 | 1 | 1 |
|---|---|---|---|---|---|---|---|---|---|---|---|---|---|---|---|
|   | 1 | 1 |   | 1 | 2 | 4 | 4 | 4 | 5 | 5 | 5 | 5 | 1 | 1 |   |
|   | 1 | 1 | 2 | 3 | 2 | 2 | 1 | 1 | 4 | 4 | 4 | 4 | 3 | 1 | 1 |
|   | 1 | 1 | 3 | 4 | 2 | 2 | 2 | 2 | 5 | 8 | 4 | 4 | 5 | 1 | 1 |
| 1 | 1 | 1 | 1 | 1 | 2 | 3 | 3 | 2 | 6 | 9 | 5 | 5 | 5 | 1 | 1 |
|   |   |   | 1 | 1 |   | 2 | 1 |   | 2 | 4 | 5 | 4 | 1 | 1 |   |
|   |   |   |   | 1 | 1 |   |   |   | 1 | 1 | 2 | 1 |   |   |   |
|   |   |   |   |   |   |   |   |   |   |   |   |   |   |   |   |

FIG. 6B — Negative 4x4 Blocks — 602, 400

|   |   |   |   |   |   | 1 | 1 |   |   | 1 | 1 |   |   | 1 |   |
|---|---|---|---|---|---|---|---|---|---|---|---|---|---|---|---|
|   |   |   |   | 1 | 2 | 3 | 5 | 5 | 5 | 4 | 3 | 3 | 3 | 2 | 1 |
|   | 1 | 1 | 1 | 2 | 3 | 6 | 7 | 7 | 5 | 4 | 6 | 7 | 4 | 1 | 1 |
|   | 1 | 1 | 3 | 4 | 2 | 2 | 3 | 4 | 2 | 2 | 4 | 6 | 4 | 1 | 1 |
|   | 1 | 1 | 2 | 3 | 2 | 2 | 3 | 4 | 4 | 5 | 3 | 4 | 4 | 2 | 2 |
|   | 1 | 1 |   | 1 | 3 | 3 | 4 | 6 | 4 | 5 | 4 | 2 | 2 |   |   |
|   |   |   |   |   |   |   | 1 | 2 | 2 | 3 | 2 | 1 | 1 |   |   |

FIG. 6A — Positive 4x4 Blocks — 600, 400

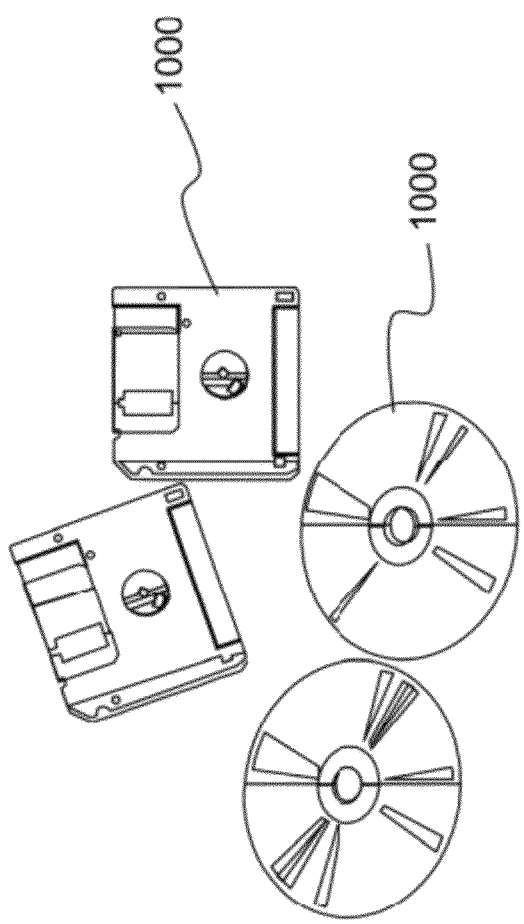

METHOD AND SYSTEM FOR GENERIC OBJECT DETECTION USING BLOCK FEATURES

PRIORITY CLAIM

The present application is a Divisional application of U.S. application Ser. No. 12/380,415, filed Feb. 27, 2009, and entitled, "Method and System for Generic Object Detection Using Block Features."

BACKGROUND OF THE INVENTION (1) Technical Field

The present invention relates to a method and system for generic object detection using block-based feature computation and, more specifically, to a method and system for massively parallel computation of object feature sets according to an optimized clock-cycle matrix.

(2) Background

Computer vision-based object detection technology is becoming more widely used in visual surveillance, active safety, and threat detection areas. The recent advances in technologies related to low-cost cameras, mote networks, low cost computational resources, and advanced vision algorithms, have brought to fruition some of the systems that were hitherto infeasible. However, there is still a strong market-driven need for real-time, embedded, mobile, and low cost systems for many time-critical applications. State of the art object detection algorithms that work on both visible and infrared imagery have been successfully developed and are currently in use, but require significant processing time and resources.

State of the art technology for detecting objects of interest in both visible and infrared imagery is not completely real-time due to its complexity. Commercial chip vendors do not have efficient systems that can accomplish this task. Although there are a few companies with motion detection systems for camcorders and surveillance video, they all suffer from high still-frame processing time which causes gaps in video quality. One wavelet-based fast image detection algorithm, disclosed in Y. Owechko, S. Medasani, and N. Srinivasa, "Classifier Swarms for Human Detection in Infrared Imagery", *Proc. of the CVPR workshop on Object Tracking and Classification Beyond the Visible Spectrum* (OTCBVS '04) 2004, has been shown to have a better performance in comparison with other detection algorithms.

Therefore, a continuing need exists for a fast object detection algorithm customized for a Very Large Scale Integration (VLSI) chip to improve processing speed and provide a real-time, embedded, mobile, and low-cost system for time-critical applications.

SUMMARY OF THE INVENTION

The present invention relates to a method and system for generic object detection using block-based feature computation and, more specifically, to a method and system for massively parallel computation of object feature sets according to an optimized clock-cycle matrix.

The method of the present invention begins with selection of an image containing an object, where the image is divided into blocks, the blocks are further divided into sections, and each section is associated with a piece of image data describing that section of the image. The image sections can comprise individual pixels, in which case the image data would comprise pixel data. Next, a class of objects to be identified is selected, where the class of objects is associated with a set of feature kernels that produce a set of feature values required to recognize an object as a member of the class, where each feature value is determined by correlating a pre-defined feature kernel with the image data from the sections of the image the feature kernel spans, and where the feature kernels may overlap or intersect such that image data in any given block can be used by any number of the features. The feature kernel set used may comprise wavelet kernels such as Haar wavelets, but is generally applicable to any feature capable of being calculated using correlation. The process of correlation across the image locations to find the feature values is mapped into a block-based operation by using block sums from the blocks that the feature kernel spans. Subsequently, a set of block sums for each block is calculated by propagating the image data corresponding to the sections in each block to a set of correlators and summing the image data to yield the set of block sums. During this act each correlator is assigned the data from one block of the image, and the number of correlators corresponds to the number of blocks in the image. Finally, a set of feature values is calculated by outputting the blocks sums at each of a set of clock cycles according to a clock cycle matrix, the block sums being outputted to a set of feature bins, where the number of feature bins corresponds to the number of features, and where the block sums corresponding to each feature are accumulated and summed, thereby yielding the set of feature values. The set of feature values can then be sent to an object classifier for recognition of the object.

In another aspect of the method of the present invention, the clock cycle matrix is determined by first calculating a redundancy factor for each block representing the number of features using that block. Next, the blocks are ranked based on their redundancy factors, where the blocks with a high redundancy factor receive a high ranking. Then, the set of features are ranked based on the ranks of the blocks they use, where features containing highly ranked blocks receive a high ranking. Subsequently, a scheduling algorithm for determining the clock cycle matrix based on the feature ranks is executed. Many scheduling algorithms can be used with the present invention, but experimentation has shown that a greedy heuristic algorithm works very well. The clock cycle matrix indicates which block sums each feature value will access during each of a set of clock cycles, whereby features that use highly ranked blocks will be scheduled so that the features access the shared blocks at different times, thereby avoiding memory race conditions. The clock cycle matrix for a given feature set is predetermined and unique to that feature set of class of objects. The clock cycle matrix only needs to be determined once for any given feature set. When a new class of objects is to be detected, a new clock cycle matrix unique to the new feature set must be determined.

In another aspect, the present invention comprises a data processing system having a memory and a processor, the data processing system including computer-readable instructions for causing the data processing system to perform the acts of the aforementioned method. The processing system can employ any of a variety of hardwired Very Large Scale Integration (VLSI) chips such as Field Programmable Gate Arrays (FPGAs), Digital Signal Processors (DSPs) and Application Specific Integrated Circuits (ASICs).

Finally, as can be appreciated by one skilled in the art, the present invention also further comprises a computer program product having computer-readable instructions encoded thereon for causing a data processing system to perform the acts of the method of the present invention.

BRIEF DESCRIPTION OF THE DRAWINGS

The objects, features and advantages of the present invention will be apparent from the following detailed descriptions of the preferred aspect of the invention in conjunction with reference to the following drawings, where:

FIG. 3A is an illustration showing the various species of Haar Wavelet Feature Kernels, as used with the present invention;

FIG. 3B is an illustration showing the optimized set of 150 wavelet features needed to distinguish a human from a non-human;

FIG. 4A is an illustration showing an image window containing an object;

FIG. 4B is an illustrations showing an image window containing the object and overlaid wavelet features;

FIG. 6A is a grid showing an example of redundancy factors for a set of positive 4×4 blocks;

FIG. 6B is a grid showing an example of redundancy factors for a set of negative 4×4 blocks;

FIG. 10 is an illustrative diagram of a computer-readable medium aspect of the present invention.

DETAILED DESCRIPTION

Figure 1:
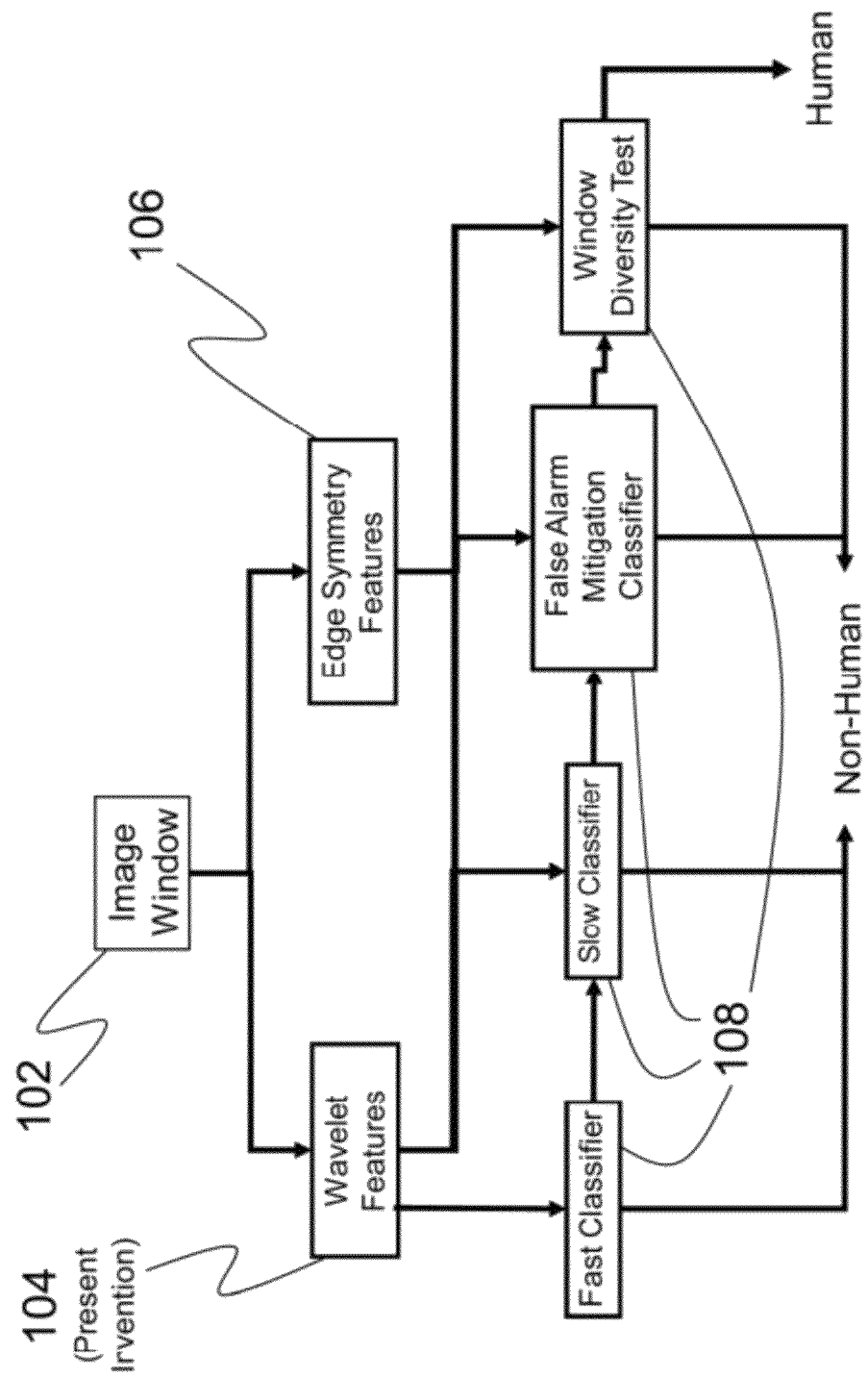
FIG. 1 is a flow diagram showing an example of an object detection framework incorporating the wavelet feature extraction method of the present invention.

The present invention relates to a method and system for generic object detection using block-based feature computation and, more specifically, to a method and system for massively parallel computation of object features sets according to an optimized clock-cycle matrix. The present invention employs bit-slice architecture embedded on a Very Large Scale Integration ("VLSI") chip such as a field programmable gate array ("FPGA") for efficiently extracting a set of features from a group of image blocks. The feature computation method uses a block-centric feature calculation approach that allows for parallel computation of features to eliminate redundant computations and save time. The parallel bit-slice computes wavelet features significantly faster than with a conventional computer, and can be embedded on a real-time, mobile system platform to allow detection of multiple types of objects in parallel.

The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that, unless explicitly stated otherwise, the figures included herein are illustrated diagrammatically and without any specific scale, as they are provided as qualitative illustrations of the concept of the present invention.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

(1.0) Introduction

This invention relates to a method and system for generic object detection using block-based feature computation and, more specifically, to a method and system for massively parallel computation of object features sets according to an optimized clock-cycle matrix. The present invention uses architecture for an embedded system platform that can run generic object detection algorithms based on block features. The Field Programmable Gate Array ("FPGA")-based embedded system is designed to be fast, cheap, and mobile; and thus desirable for several real-time object detection applications. The resulting chip design is a parallel bit-slice architecture that maps wavelet feature extraction blocks and computes the wavelet features 500 times faster than a comparable conventional personal computer. The block-based feature calculation approach is a move away from serial computation toward parallel computation of features, which reduces redundant computations. In addition, a heuristic optimization framework is used to optimize the features to blocks memory reads and reduce memory race conditions.

(2.0) Glossary of Terms

In order to provide a working frame of reference, a glossary of some of the terms used in the description and claims is given as a central resource for the reader. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. Further, the definitions provided should not be considered limiting to the extent that the terms are known in the art. These definitions are provided to assist in the understanding of the present invention.

Block—The partitioning of an image into sub-regions using a regular grid. Each element in the grid is a block.

Feature Kernel—A mask that detects a particular signature in an underlying region of an image. The correlation of a feature kernel with the underlying image region yields a feature value.

Feature Value (or Feature)—A value extracted from an underlying region in the image using a feature kernel.

(3.0) Object Detection Framework

The method of object detection of the present invention, although useful in isolation, was designed to be implemented as part of a larger object detection framework. The object detection framework in U.S. patent application Ser. No. 10/918,336 filed Aug. 14, 2004, titled "OBJECT RECOGNITION INCORPORATING SWARMING DOMAIN CLASSIFIERS," by Owechko, et al., incorporated by reference as though fully set forth herein, has one of the best false alarm rates of any system in literature. An overview of the object detection framework is shown in FIG. 1. In this framework, two types of features, Haar wavelet-based multiscale features and fuzzy edge-symmetry features are extracted from an object. The object is presented via an image window 102 and the wavelet features are extracted by the wavelet feature extraction block 104 and the fuzzy image symmetry features are extracted by the Edge Symmetry Features block 106. The extracted features are fed through a cascade of object classifiers 108 to determine the class of the object in the image window 102. The wavelet feature extraction block 104 is the main bottleneck in the current framework. The present invention provides a method and system for streamlining the wavelet feature extraction process, thereby alleviating the bottleneck. It should be noted that although the examples in the present application focus on calculating wavelet features, the method of the present invention is generally applicable to any feature set capable of being calculated using correlation.

(4.0) Method of Block-based Feature Extraction

Figure 2:
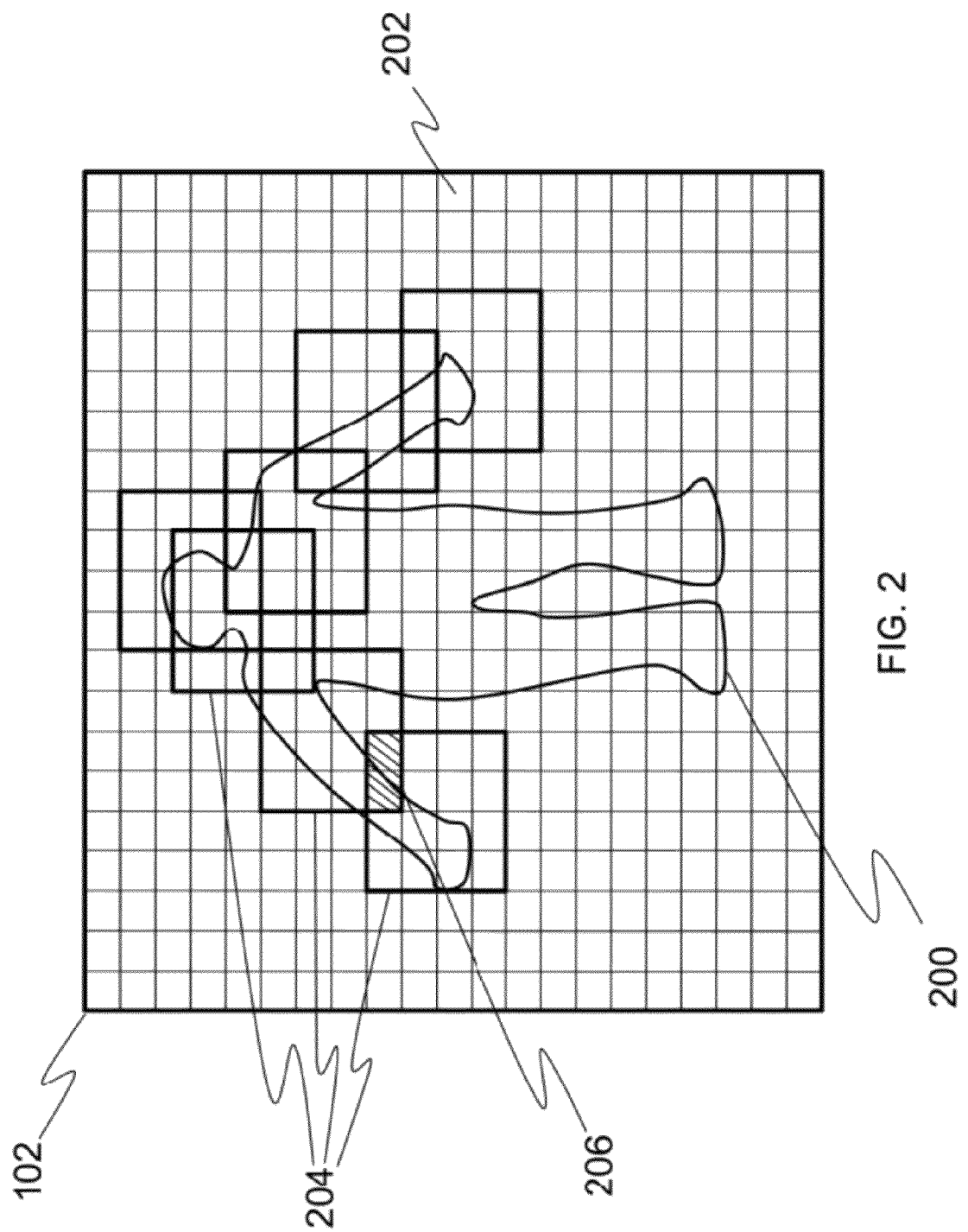
FIG. 2 is an illustration showing an image window divided into blocks and overlaid with wavelet features.

The method of the present invention requires selection of a class of objects to be identified. The class of objects is associated with a set of feature kernels and corresponding feature values for recognizing an object as a member of the class. FIG. 2 is an illustration of an image window 102 containing an object 200, in this case a human form. The image window 102 is divided into blocks 202. A set of feature kernels 204 corresponding to the class of objects to be recognized is overlaid on the object 200. The feature kernels 204 may overlap or intersect 206, such that image data in any given block 202 can be used by any number of the features 204. One aspect of the present invention uses a set of Haar wavelet feature kernels of three orientations, vertical (V) 300, horizontal (H) 302, and diagonal (D) 304 as shown in FIG. 3A. Each Haar wavelet feature is divided into positive 308 and negative 310 sections. The wavelet feature kernel 300, 302 and 304 is correlated with the pixel values in the underlying image, then the positive 308 and negative 310 sections are summed to yield a feature value. Haar wavelet features are desirable in that they provide high spatial resolution as well as model edges at multiple scales and two orientations. However, other feature kernel types may be used depending on the class of objects to be identified and the computational resources available. For instance, Gabor wavelets, which are a bio-inspired wavelet type known in the art, have modeling advantages over Haar wavelets because Gabor wavelets can handle multiple orientations. But, Gabor wavelets are complex and computationally expensive to compute. In cases where precise modeling is desired over computational efficiency, Gabor wavelets may be a suitable choice. Another alternative is thresholded Gabor wavelets, also known in the art, which are closer to Haar wavelets in computational cost, and do not require multiplications in order to extract feature values.

The number and locations of feature kernels used for distinguishing members of a class of objects is unique to each class. For instance, for detection of humans, experimentation has yielded a concise set of 150 wavelet features 306 necessary to distinguish a human from a non-human, as shown in FIG. 3B. Detecting a different class of objects would require first determining a different set of features to distinguish members of the class. The method for selecting an optimized set of wavelet features for any given class of objects is disclosed in Y. Owechko, S. Medasani, and N. Srinivasa, "Classifier Swarms for Human Detection in Infrared Imagery", *Proc. of the CVPR workshop on Object Tracking and Classification Beyond the Visible Spectrum* (OTCBVS '04) 2004, incorporated by reference as though fully set forth herein.

Referring back to FIG. 2, the size and number of blocks 202 depends on the resolution of the image window 102 and the level of detail of the features to be computed. Generally, the block size should be chosen so that the features 204 analyzed will occupy a whole number of blocks 202. Each block 202 is associated with image data from that block of the image. The image data can comprise pixel data, however, the method of the present invention can also be used with non-pixel image data. The feature values are determined by correlating each feature kernel 204 with the image data corresponding to the section of the image the feature kernel spans.

Typical approaches to extracting Haar wavelet features from an image window 102 involve serially computing the inner product of the selected wavelet kernel 204 (in FIG. 2) with the underlying image data. This feature-centric approach, however, results in redundant computation of regions that are common to multiple features 206. The present invention streamlines the feature extraction process by eliminating this redundant computation. To accomplish this, a block-based approach instead of the feature-based approach was used. In the block-based approach, a block sum is calculated for each block only once, and a list is maintained of all the blocks that are needed to compute each of the features. This block-based feature computation allows for easily parallelization of the feature computation process.

Figure 4D:
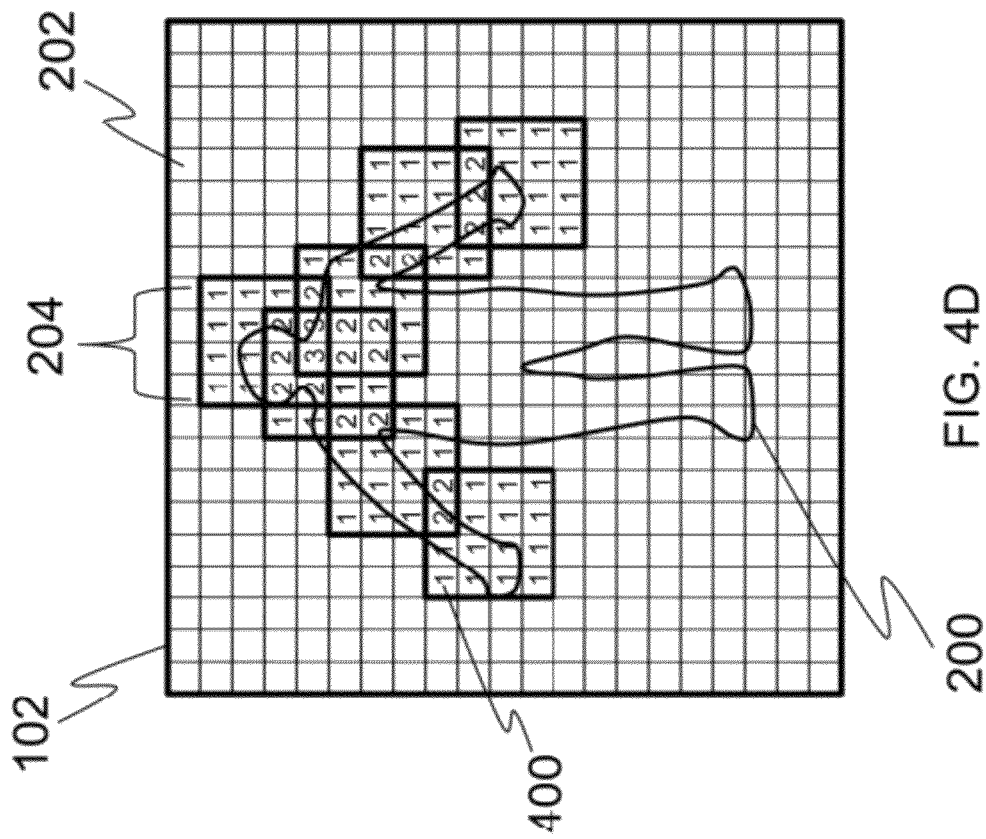
FIG. 4D is an illustration showing an image window containing an object and overlaid wavelet features, where the image window is broken down into blocks, and the blocks are assigned a redundancy factor.
Figure 4C:
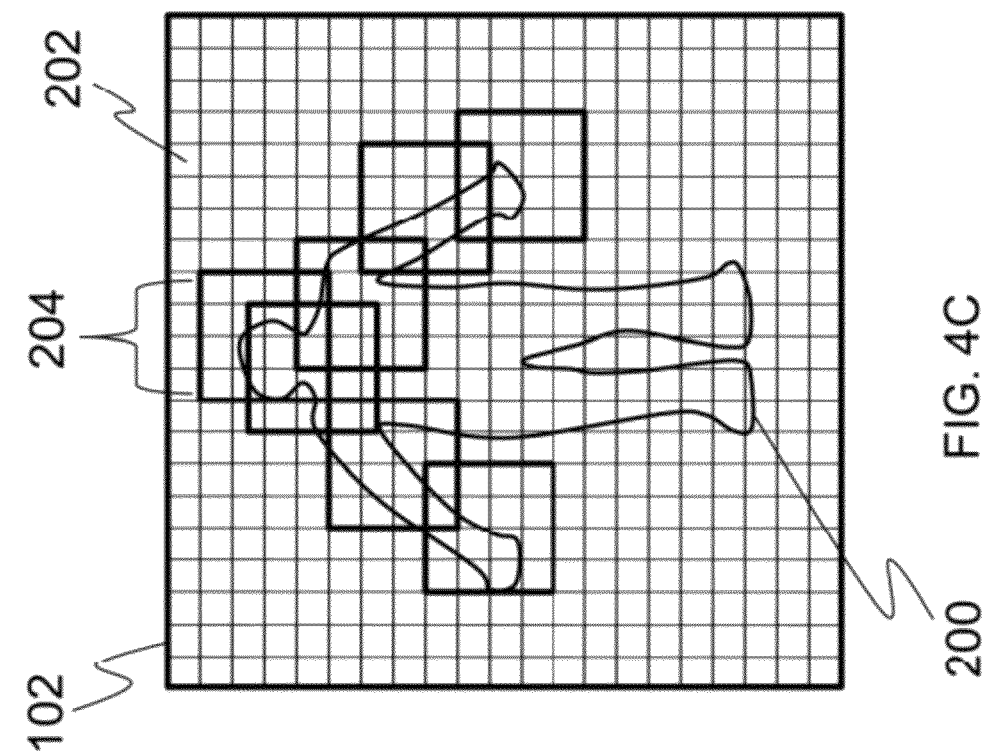
FIG. 4C is an illustration showing an image window containing an object and overlaid wavelet features, where the image window is broken down into blocks.

FIGS. 4A-4D illustrate acts in the block-based feature computation process of the present invention. In FIG. 4A, an image window 102 containing an object 200 is selected. In this case, the object 200 is a potential human form. Then, as shown in FIG. 4B, set of feature kernels 204 corresponding to detecting a human class of objects is overlaid on the image window 102. Next, as shown in FIG. 4C, the image window is partitioned into a grid of blocks 202. Generally, the block size should be chosen so that the features 204 analyzed will occupy a whole number of blocks 202. In FIG. 4D, each block has been assigned a redundancy value 400 based on how many features use that block. The redundancy values 400 are used to schedule blocks for computation during the block sum computation process, described below.

Figure 5:
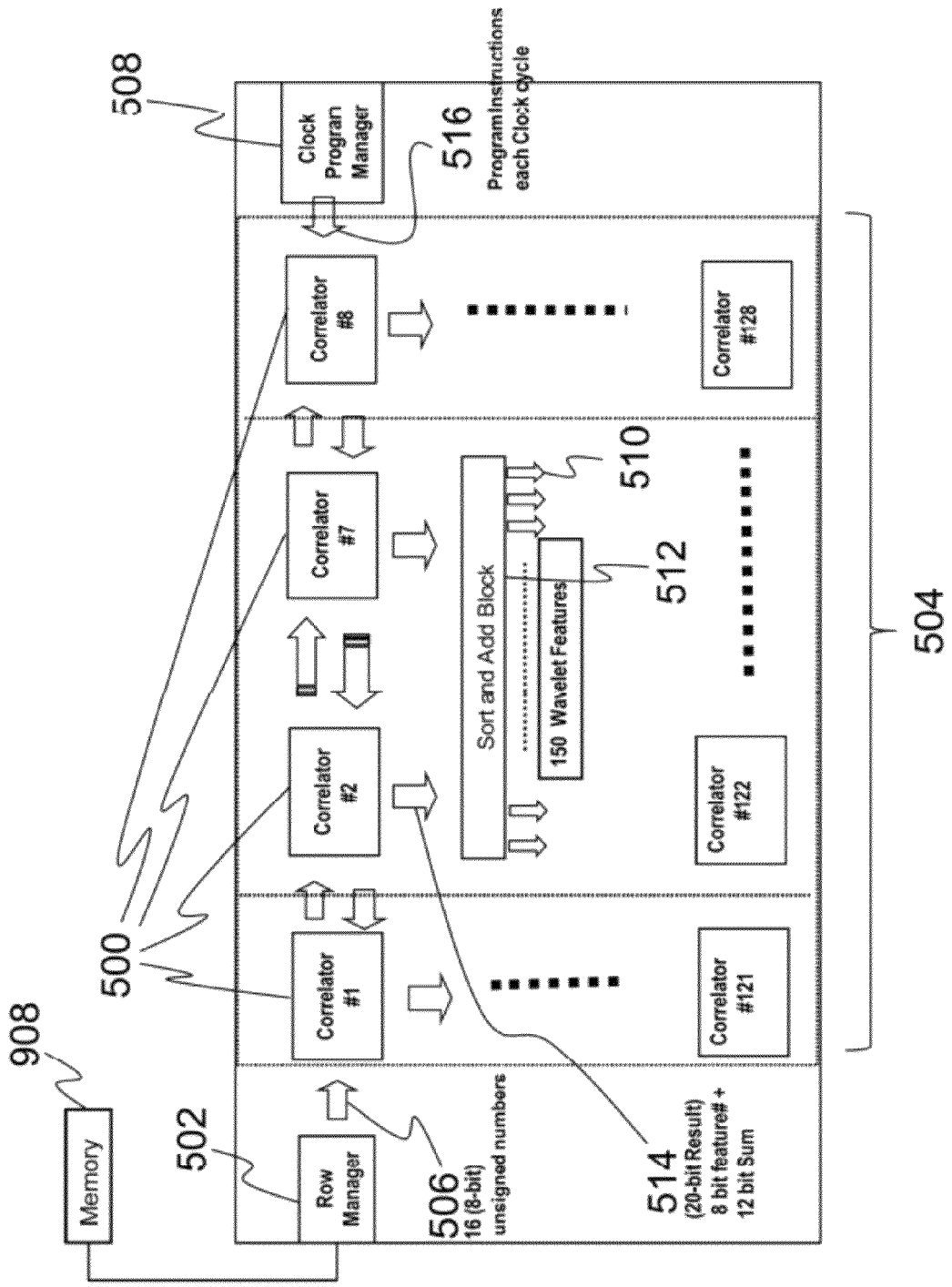
FIG. 5 is a block diagram showing the bit-slice architecture of the correlator framework according to the present invention.

The block sums are calculated by summing the image data in each block 202 (in FIG. 2). Each of a set of correlators is assigned the data from one block 202 of the image window 102, and the number of correlators corresponds to the number of blocks 202 in the image. The correlators perform a cross correlation between the image data and the feature kernel to produce a feature value. FIG. 5 shows an illustration of the bit-slice architecture of the object detector of the present invention as implanted on a Field Programmable Gate Array ("FPGA") chip. In the example shown in FIG. 5, a set of 128 correlators 500 is used, corresponding to an image window 102 (in FIG. 2) that has been divided into 128 blocks 202, but the present invention can use any number of correlators depending on the block 202 breakdown of the image window 102. Again, the block 202 breakdown of the image window 102 will depend on the degree of detail needed to align the required features 204 onto a whole number of blocks 202, as shown in FIG. 2. Further detail regarding the operations of the bit-slice architecture is described in section (5.0) below.

Once the block sums are computed, a scheduling algorithm is needed to avoid memory race conditions wherein different features try to access a common block sum at the same time. Several approaches were attempted in the process of finding a scheduling scheme, ranging from solving a complex integer programming problem to simple heuristic solutions. A heuristic greedy optimization method was chosen to solve the scheduling problem. The greedy heuristic approach also helps to find a best clock cycle matrix, the clock cycle matrix specifies which block sum each feature will access during each clock cycle. The worst case scheduling scenario is where the features are computed serially, in which case it would take 1200 clock cycles to compute the 150 features necessary to detect a human. The best case scheduling scenario would be where no blocks overlap and the features can be computed in a maximum of eight cycles.

In determining an optimal clock cycle matrix, priority is assigned to schedule block sums that need to be accessed by more then one feature, since they cause the bottleneck in feature computation. First, a redundancy factor 400 (FIG. 4D) is calculated for each block 202, representing the number of features using that block. FIGS. 6A and 6B show a set of positive wavelet blocks 600 and negative wavelet blocks 602, respectively, numerically-coded according to their redundancy factors 400. Next, all blocks 600 and 602 are ranked by their redundancy factors 400, where blocks with a high redundancy receive a high ranking. Subsequently all the features are ranked based on the ranks of the blocks they use, where features containing highly ranked blocks receive a high ranking. Finally, a scheduling algorithm such as a greedy heuristic algorithm is executed to determine the clock cycle matrix. The clock cycle matrix need only be determined once for each unique feature set used.

The basic strategy of the greedy heuristic algorithm is as follows: In a first clock cycle, the method starts with the highest ranked feature and accesses its most redundant block; the process is then repeated for all the other features, making sure there are no block overlaps in this clock cycle. The process is then repeated for a second clock cycle, a third, and so forth until all features are computed. The resulting clock cycle matrix, identifies the particular block sum that each feature needs to access in every clock cycle. In the embodiment described above, only 51 clock cycles are required to compute the 150 features necessary to identify a human.

Now, the feature computation process has been transformed from a serial mode to a parallel mode where only 51 clock cycles are needed to compute 150 features. Again, block prioritization process described above needs to be done only once for each new classifier feature set. The following sections are a description of the FPGA bit-slice architecture used to compute the feature values.

(5.0) Object Detector Bit-Slice Architecture

In one preferred embodiment, the bit-slice architecture of the present invention can be implemented on a wide variety of hardwired VLSI chips such as Field Programmable Gate Arrays (FPGAs), Digital Signal Processors (DSPs) and Application Specific Integrated Circuits (ASICs). The architecture is modular and scalable, which makes it very attractive for imaging applications which require fast processing of images of varying sizes and resolution.

(5.1) Detector Row Manager (RM)

As shown in FIG. 5, the detector row manager 502 is the interface between a memory 908 (FIG. 9) storing image data (i.e. pixel data) and the Correlator Module 504 (FIG. 5). The row manager 502 populates each of the correlators 500 in a given row with 8 bit pixel values 506 from the image frame. When all of the correlators 500 get populated the row manager 502 sends an interrupt signaling that it has completed propagating the image frame. The Row Manager is referenced by a clock.

(5.2) Correlator Module (CTM)/Correlator (CT)

Based on the block breakdown of the image window 102 being processed, a corresponding number of correlators 500 (FIG. 5) are grouped together in a correlator module 504. In the example of human detection used in the present invention, with a 64×32 sized pixel window, sixteen bit-slices (rows) of eight correlators 500 per bit-slice were used, as shown in FIG. 5. The correlator 500 performs the computations required to generate the wavelet feature data based on the instruction from a clock manager 508. The correlator, block 504 is a sequential circuit and is budgeted for timing constraints such as setup and hold time. Setup time violations are mitigated by choosing the optimum clock speed. Hold time failures which result in a race condition where a correlator calculates a block sum in the same clock phase as when its pixel data is propagated can be fixed by adding extra time delay elements between the correlators.

Figure 7:
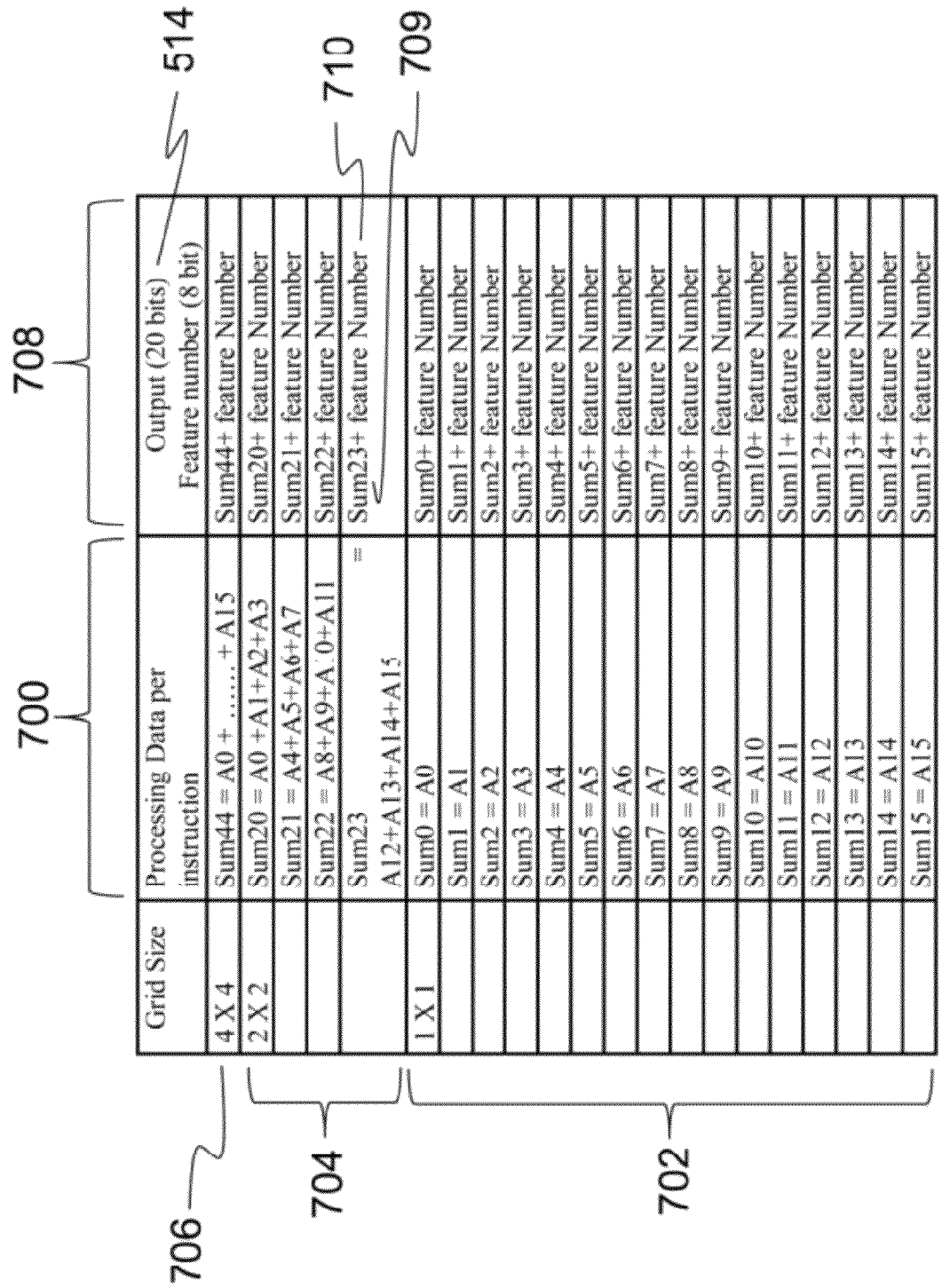
FIG. 7 is a chart showing the two operating modes of the correlators in the bit-slice architecture of the present invention.

The correlators 500 operate in two different modes as shown in FIG. 7. In a first mode 700, the correlator calculates the block sums for all the combinations of pixel groupings assigned to that correlator. The correlator in the example shown in FIG. 6 is responsible for a sixteen-pixel section of the image, the sixteen pieces of pixel data labeled A0-A15. In a first clock cycle, the 1×1 pixel sums 702 are calculated for the block. In a next clock cycle, the 2×2 pixel sums 704 are calculated for the block. In a subsequent clock cycle, the 4×4 pixel sum 706 for the entire block is calculated. A variety of block sums for the block assigned to that correlator are now readily available to be used by the various features. An interrupt is sent out from each correlator 700 (FIG. 5) when the sum for the features is computed.

In a second mode 708 (FIG. 7) the correlator outputs 514 (FIGS. 5 and 7) the requested block sum 709 along with a feature number 710 on an output bus, the feature number 710 indicating which feature bin 510 (FIG. 5) in the Sort and Add Block 512 (discussed below) the output 514 will be routed to. The feature number 710 is 8 bits long and can address more than the 150 features necessary to detect a human. The total correlator output 514 is 20-bits, as it includes the 8-bit feature number 710 and the 12-bit block sum 709.

(5.3) Clock Program Manager (CM)

As the name suggests, the Clock Program Manager 508 (FIG. 5) is referenced by a clock and is responsible for sending instructions 516 to the correlator at each clock cycle. Based on the clock cycle matrix described earlier a 16-bit instruction 516 is sent out to each correlator 500 such that there is no contention among correlators 500 at any given clock cycle. Each correlator 500 then performs the operation based on the instruction issued and outputs the result 514. The Clock Manager 508 goes into a wait state after sending each instruction 516. After all the correlators 500 in the correlator module (CTM) 504 are done loading the result 514, the Clock Manager 508 sends the next instruction 516. The clock manager instruction 516 contains 16-bits: add/subtract (2-bits), the wavelet kernel location (4-bits), the kernel type (2-bits), and the feature number (8-bits).

(5.4) Sort and Add Block (SAM)

The Sort and Add Block 512 (FIG. 5) computes the wavelet feature set using the partial sums 709 (FIG. 7) generated by the correlators 500. The Sort and Add Block 512 (FIG. 5) routes the partial sum 709 to the corresponding feature accumulate and add registers 510 (feature bins) based on the feature number 710 (FIG. 7).

(5.5) Timing Operation

Figure 8:
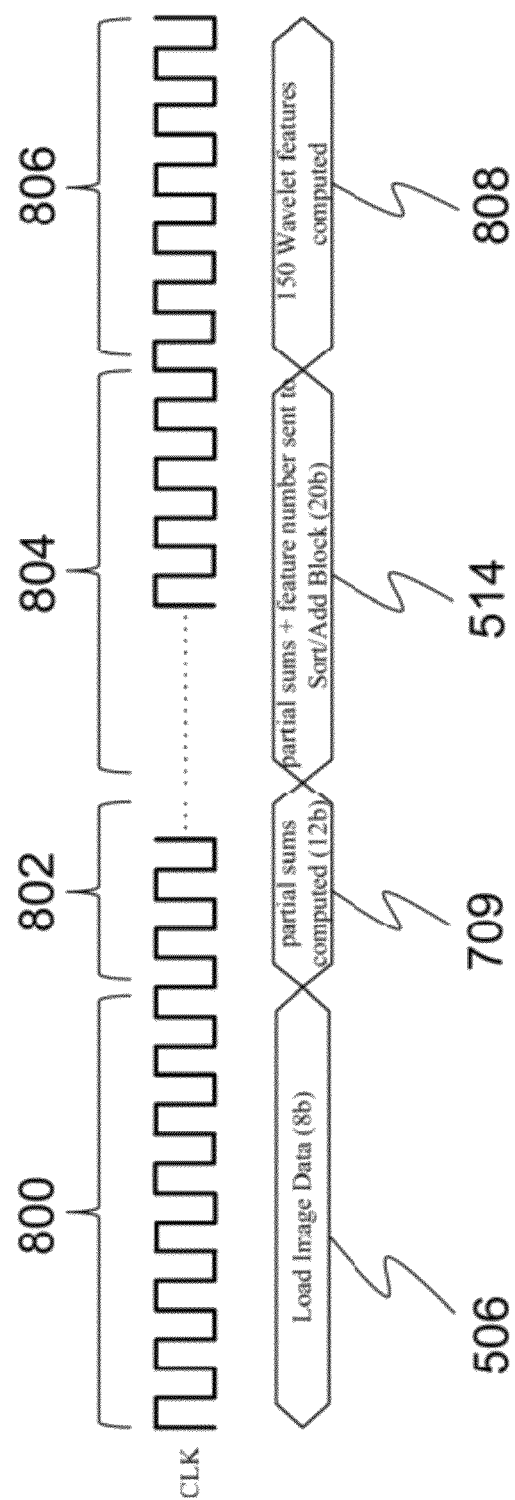
FIG. 8 is a diagram showing the sequential timing operations of the bit-slice architecture of the present invention.

FIG. 8 is a diagram showing the sequential timing operations of the above described bit-slice architecture. During a first set of clock cycles 800, 8-bit image data 506 is loaded into the correlators. Then, during a second set of clock cycles 802, the 12-bit partial sums 709 are computed. Next, during a third set of clock cycles 804, the 20-bit result 514 including partial sums and feature number are sent to the Sort/Add Block. Finally, during a fourth set of clock cycles 806, the feature values are computed 808 by routing the partial sums 709 to their corresponding feature accumulate and add registers 510 (in FIG. 5).

(6.0) FPGA Implementation

The object detection algorithm code can be mapped into a Very High Speed Integrated Circuit ("VHSIC") Hardware Description Language ("VHDL") as well as a corresponding Register Transfer Language ("RTL") for a member of the Altera family of FPGAs. The VHDL and RTL mapping provides for the development of multiuse VHDL cores. In addition, the scalable architecture enables easy technology transition to embedded platforms and allows detection of multiple types of objects in parallel. The previously described bit slice architecture has been successfully implemented on an Altera Startix II EP2S15F484C3 FPGA operating at 330 MHz Single Phase Clock. The supplier of the Altera Stratix II DSP builder software and Altera DSP Development hardware board is Future Electronics, 26570 Agoura Rd., Calabasas, Calif. 91302, (818) 871-1740. The manufacturer is Altera Corporation, San Fernando Valley, Calif. (818) 428-1646. A generic substitute for Altera is the Xilinx Spartan DSP Development Board, from Xilinx, Inc., 2100 Logic Drive, San Jose, Calif. 95124-3400.

Based on preliminary simulation results, the estimate of the total time required to compute the 150 features for human detection inside Altera's Quartus II simulation and synthesis platform is: Total Time to compute 150 Features in parallel (Ignoring Contamination Delay and memory access cycle time)

Image Load time (Timg)=8 clocks
Correlator Computation Time (Tct)=2 clocks
Correlator Module Computation Time (Tcmt)=Twait+Tct=10clocks
Number of Instructions per Clock (Ni)=29

$$\text{Total Time} = Tpc + Ni \times Tcmt + Tsort\_add$$
$$= 8 + 29 \times 10 + 15$$
$$= 313 \text{ Clocks} = 1.81 \text{ μs(Assuming 300 Mhz Clock)}$$

(7.0) Data Processing System

Figure 9:
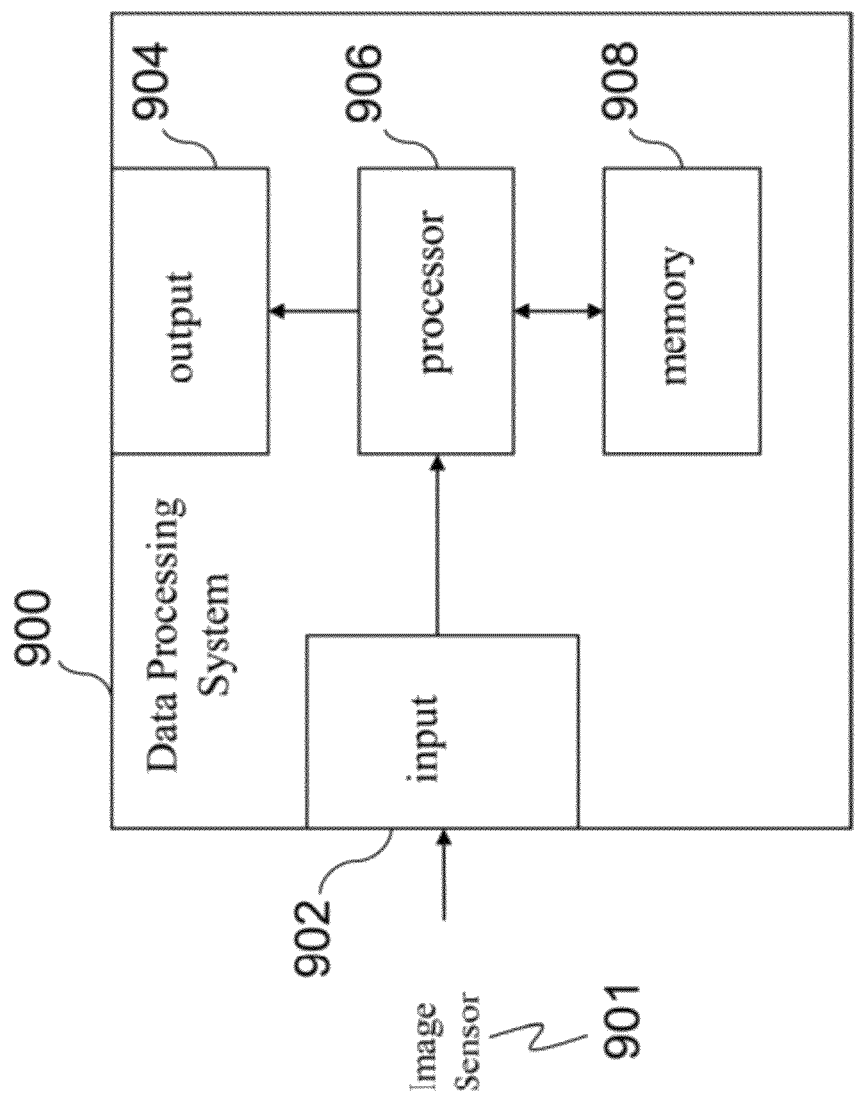
FIG. 9 is a block diagram of a general data processing system for use with the present invention.

A block diagram depicting the components of a generic data processing system for use with the present invention is provided in FIG. 9. The image processing system 900 comprises an input 902 for receiving information from at least one sensor 901 detecting image intensity in a scene. Note that the input 902 may include multiple "ports." Typically, input is received from at least one sensor, non-limiting examples of which include video image sensors. The processor 906 provides output 904 regarding the presence and/or identity of object(s) in the scene. Output may also be provided to other devices or other programs; e.g., to other software modules, for use therein. The input 902 and the output 904 are both coupled with a processor 906, the processor containing a VLSI chip capable of supporting the bit-slice architecture and performing the steps of the method of the present invention, as previously described. The processor 906 is coupled with a memory 908 to permit storage of data such as image memory strings and software that are to be manipulated by commands to the processor 906.

(8.0) Computer Program Product

An illustrative diagram of a computer program product embodying the present invention is depicted in FIG. 10. The computer program product 1000 is depicted as an optical disk such as a CD or DVD, but the computer program product generally represents any platform containing computer-readable instructions for causing a data processing system to perform the acts of the method of the present invention, as previously described.

What is claimed is:

1. A device for calculating a set of feature values for use in generic object detection, the device comprising bit-slice architecture mounted on a Very Large Scale Integration (VLSI) chip, the bit-slice architecture comprising:
   a detector row manager configured to:
      receive image data corresponding to a set of blocks in an image;
      populate a set of correlators with the image data at each of a set of clock cycles;
   a clock program manager configured to:
      send instructions to the set of correlators at each of the set of clock cycles according to a clock cycle matrix; and
   a correlator module comprising the set of correlators, the set of correlators configured to:
      receive image data form the detector row manager;
      calculate the set of block sums from the image data according to the instructions from the clock program manager; and
      output the block sums at each of the set of clock cycles;
   a sort and add module configured to:
      receive the block sums from the set of correlators at each clock cycle;
      route the block sums to a set of feature bins, where each of the set of feature bins corresponds to a feature value to be calculated; and
      accumulate and add the block sums in each feature bin, thereby yielding the set of feature values.

2. The device of claim 1, further comprising a clock cycle matrix containing scheduling instructions for determining which block sums each correlator will compute at each clock cycle.

3. The device of claim 2, further comprising a data processing system comprising:
   an input for receiving image data;
   a memory configured to store the image data;
   at least one processor containing the VLSI chip, the processor configured to operate the VLSI chip; and
   an output configured to output the set of feature values.

* * * * *